US00RE37542E

(19) United States
(12) Reissued Patent
Ichikawa et al.

(10) Patent Number: US RE37,542 E
(45) Date of Reissued Patent: Feb. 5, 2002

(54) TONER CARTRIDGE FOR A DEVELOPING DEVICE INCLUDED IN AN IMAGE FORMING APPARATUS

(75) Inventors: Hideo Ichikawa; Seiji Terazawa, both of Numazu; Sunao Ikeda, Yokohama, all of (JP)

(73) Assignee: Ricoh Company, Ltd., Tokyo (JP)

(21) Appl. No.: 09/368,411

(22) Filed: Aug. 5, 1999

Related U.S. Patent Documents

Reissue of:
(64) Patent No.: 5,655,195
Issued: Aug. 5, 1997
Appl. No.: 08/502,607
Filed: Jul. 14, 1995

(30) Foreign Application Priority Data

| | | |
|---|---|---|
| Sep. 16, 1994 | (JP) | 6-221610 |
| Dec. 14, 1994 | (JP) | 6-310773 |
| May 23, 1995 | (JP) | 7-123498 |
| Jul. 15, 1999 | (JP) | 6-163774 |

(51) Int. Cl.[7] ..... G03G 15/08
(52) U.S. Cl. ..... 399/263; 399/258
(58) Field of Search ..... 399/111, 119, 399/254, 256, 258, 262, 263

(56) References Cited

U.S. PATENT DOCUMENTS

| | | | | |
|---|---|---|---|---|
| 4,515,483 A | * | 5/1985 | Muller et al. | |
| 5,036,358 A | * | 7/1991 | Yoshida | 399/64 |
| 5,134,441 A | * | 7/1992 | Nagata et al. | 399/103 |
| 5,202,732 A | * | 4/1993 | Yahata | 399/263 |
| 5,260,750 A | * | 11/1993 | Ishida et al. | 399/262 |
| 5,337,032 A | * | 8/1994 | Baker et al. | 399/111 |
| 5,455,662 A | | 10/1995 | Ichikawa et al. | |
| 5,489,976 A | | 2/1996 | Ichikawa | |
| 5,500,719 A | | 3/1996 | Ichikawa et al. | |
| 5,627,631 A | | 5/1997 | Ichikawa et al. | |
| 5,822,663 A | | 10/1998 | Ichikawa et al. | |
| 5,918,090 A | | 6/1999 | Ichikawa et al. | |

FOREIGN PATENT DOCUMENTS

| | | | |
|---|---|---|---|
| EP | 0360198 | * | 3/1990 |
| GB | 2238402 | * | 5/1991 |
| GB | 2257534 | * | 1/1993 |
| JP | 63-173250 | * | 7/1988 |
| JP | 4-125668 | * | 4/1992 |
| JP | 4-260075 | * | 9/1992 |
| JP | 5-165325 | * | 7/1993 |

OTHER PUBLICATIONS

Patent Abstracts of Japan, vol. 17, No. 341(P–1565), Jun. 28, 1993, JP–A–05046026, Feb. 26, 1993.*

Patent Abstracts of Japan, vol. 16, No. 243(P–1364), Jun. 4, 1992, JP–A–04053982, Feb. 21, 1992.*

* cited by examiner

*Primary Examiner*—Sandra Brase
(74) *Attorney, Agent, or Firm*—Oblon, Spivak, McClelland, Maier & Neustadt, P.C.

(57) ABSTRACT

In a developing device included in an image forming apparatus, a toner cartridge has a body and a replenishing member disposed in the body. The cartridge makes it needless to adhere or otherwise affix an elastic piece to the edge of the base of the replenishing member that slidably contacts the inner periphery of the body. The replenishing member is capable of scooping up toner while being held in sliding contact with the inner periphery of the body under a constant pressure.

34 Claims, 14 Drawing Sheets

TONER CARTRIDGE FOR A DEVELOPING DEVICE INCLUDED IN AN IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a developing device included in an image forming apparatus and, more particularly, to a toner cartridge removably mounted to the developing device and having a replenishing member therein which is rotatable to replenish toner from the cartridge into the developing device.

2. Discussion of the Background

It is a common practice with a copier, facsimile apparatus, laser printer or similar electrophotographic image forming apparatus to replenish fresh toner from a removable toner cartridge into a developing device. A conventional toner cartridge has a hollow cylindrical body, and a replenishing member disposed in the body and having a rotary shaft. The replenishing member is made up of a scoop plate or base for scooping up the toner, and rake plates for raking the toner in the axial direction of the shaft. A flexible rectangular strip is adhered to or otherwise affixed to the edge of the scoop plate that adjoins the inner wall of the body. A similar flexible strip is adhered to or otherwise affixed to the edge of each rake plate.

However, a problem with the conventional cartridge is that the flexible strip must be adhered to each of the scoop plate and scrape plate, resulting in an extra step and extra cost. Moreover, the strip is apt to come off the scoop plate if the adhesion is defective or due to aging. Of course, the strip may be affixed to the scoop plate by crimping, fusing or similar technology, as proposed in the past. However, this also results in an extra step and extra cost and, in addition, causes the strip to come off easily.

SUMMARY OF THE INVENTION

It is, therefore, an object of the present invention to provide a toner cartridge for a developing device of an image forming apparatus, and which is capable of eliminating a step of affixing an elastic piece to the base of a replenishing member, and scooping up toner while sliding on a cartridge body under a constant pressure.

A toner cartridge for replenishing toner into a developing device of the present invention has a cartridge body formed with a toner supply port, and a replenishing member rotatably disposed in the cartridge body, and for replenishing the toner from the cartridge body in the developing device via the toner supply port when rotated. The replenishing member has a base having a rotary shaft, and a thin piece provided at the free edge of the base. The base and thin piece are implemented as a single molding.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 11:
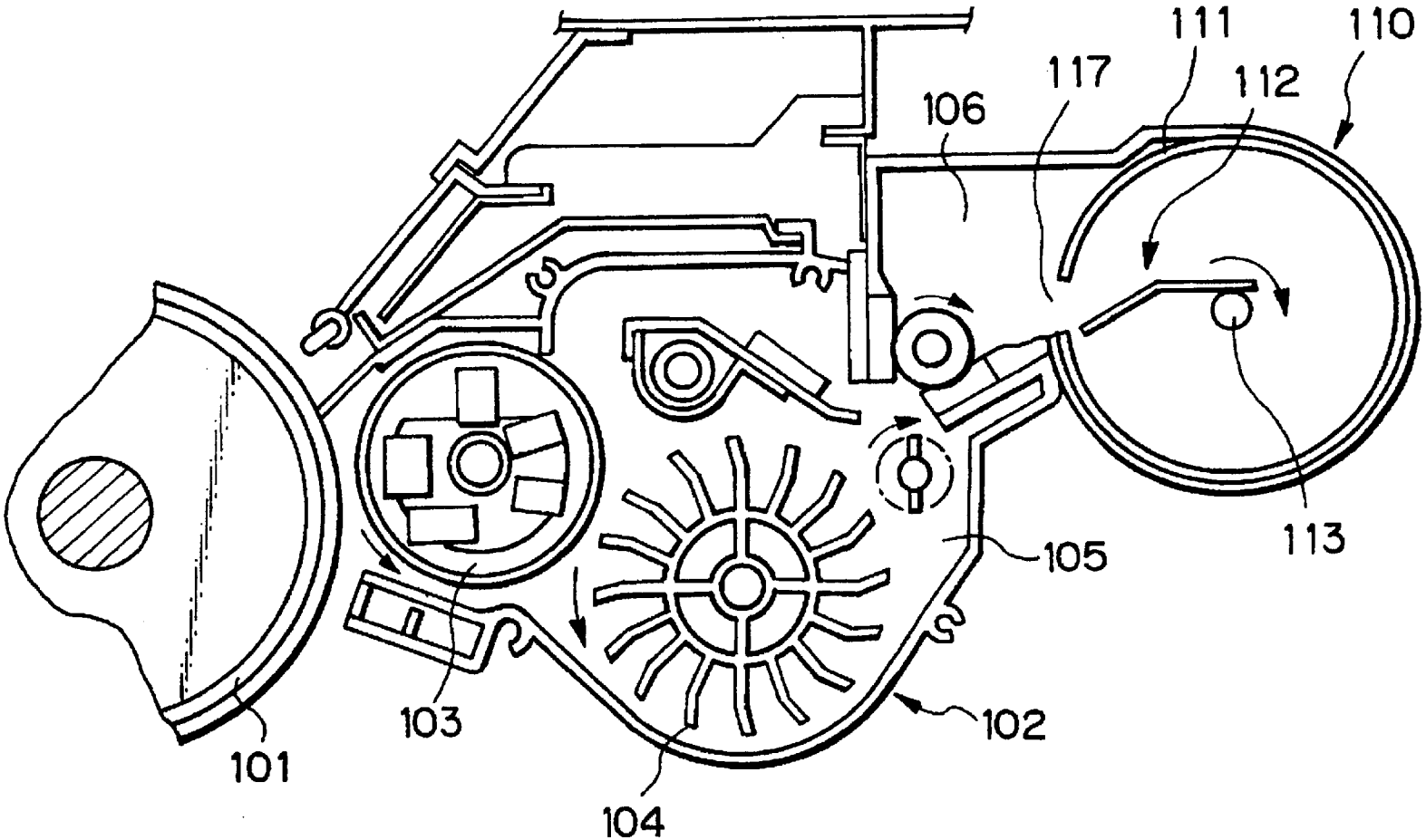
Fig. 11 PRIOR ART
FIG. 11 shows a developing device implemented with a conventional toner cartridge.

To better understand the present invention, a brief reference will be made to a conventional toner cartridge. FIG. 11 shows a developing device operable with a conventional toner cartridge. As shown, the developing device, generally 102, has a developing chamber 105 accommodating a magnet roller 103, an agitator 104, and other conventional members. The magnet roller 103 is located to face a photoconductive element in the form of a drum 101. A toner cartridge 110 is removably mounted to a toner hopper 106 which communicates with the developing chamber 105. Fresh toner is replenished from the cartridge 110 into the hopper 106 via a toner outlet 117 formed in the cartridge 110. The toner in the hopper 106 is supplied to the developing chamber 105 in a predetermined amount at a time.

Figure 12:
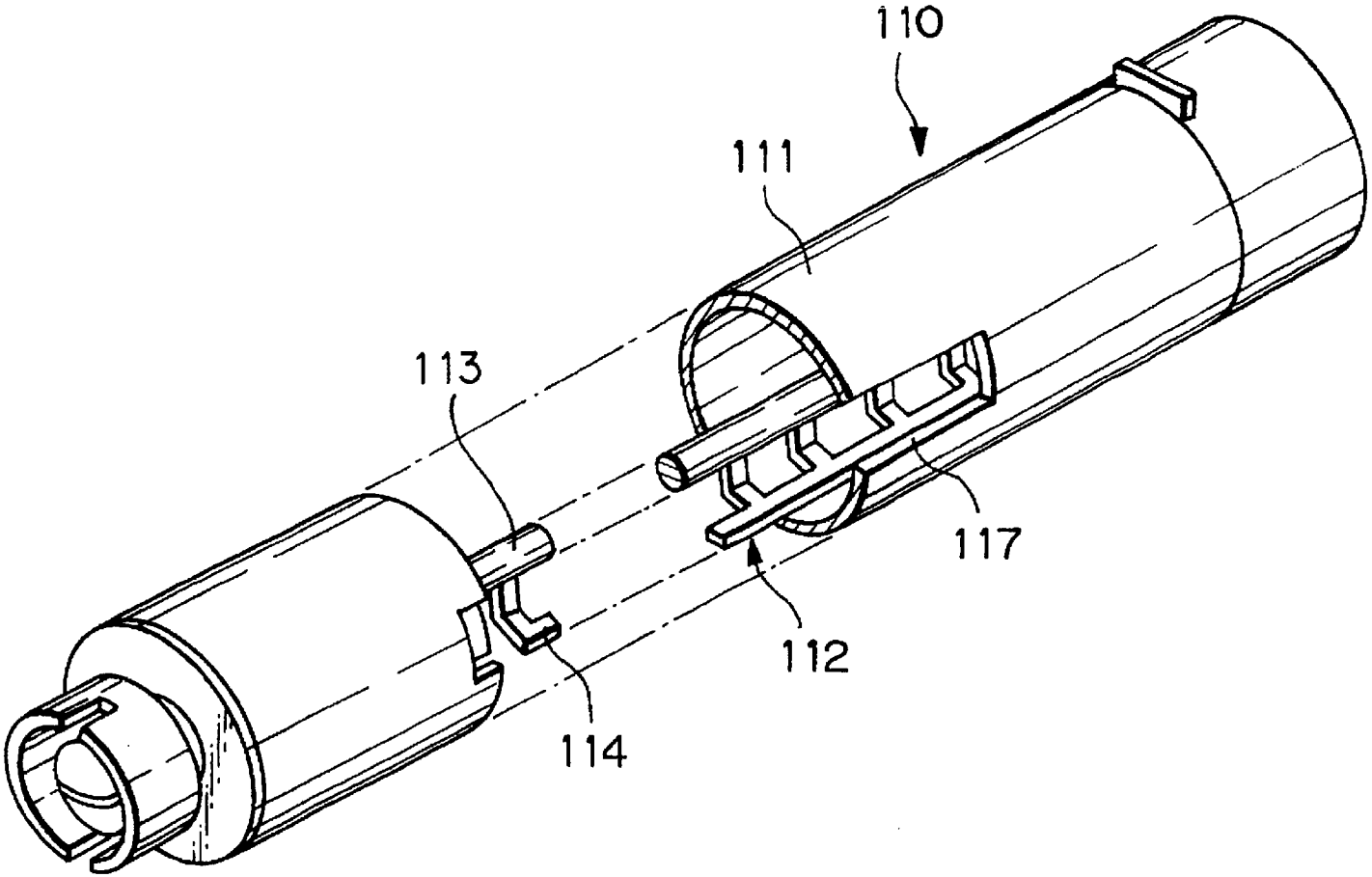
Fig. 12 PRIOR ART
FIG. 12 is a perspective view of the conventional toner cartridge.
Figure 13:
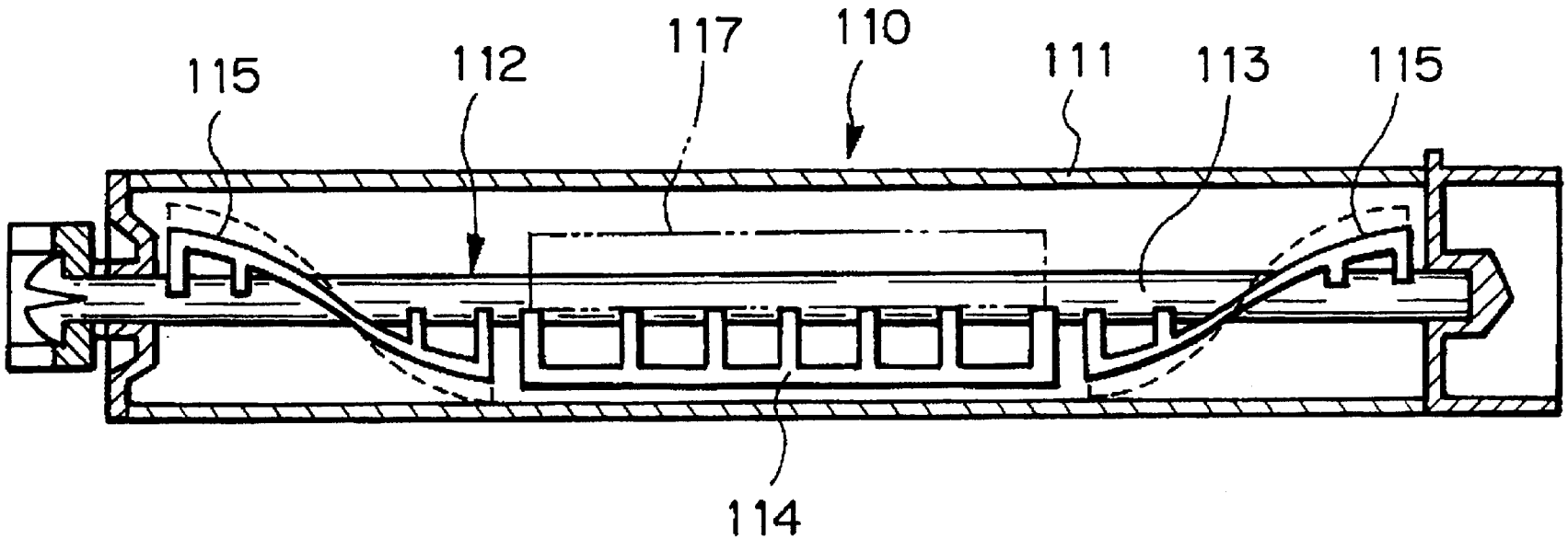
Fig. 13 PRIOR ART
FIG. 13 is a section of the conventional toner cartridge.
Figure 14:
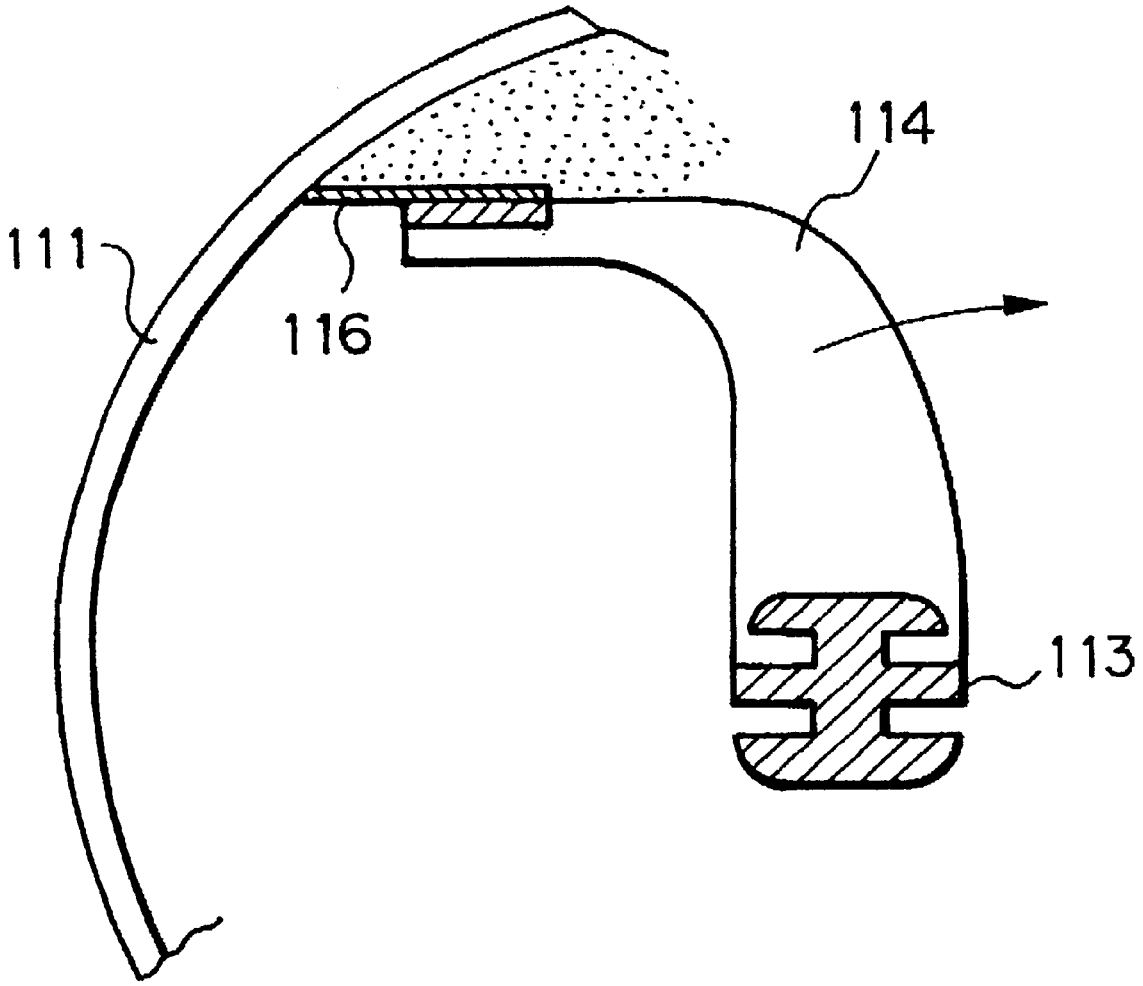
Fig. 14 PRIOR ART
FIG. 14 is a section of a replenishing member disposed in the conventional toner cartridge.

As shown in FIGS. 12 and 13, the cartridge 110 has a hollow cylindrical body 111 accommodating a replenishing member 112 therein. A rotary shaft 113 is affixed to or molded integrally with the replenishing member 112. The replenishing member 112 is made up of a scoop plate or base 114 for scooping up the toner, and rake plates 115 for raking the toner in the axial direction of the shaft 113. As shown in FIG. 14, a flexible rectangular strip 116 is adhered to or otherwise affixed to the edge of the scoop plate 114 that adjoins the inner wall of the body 110. A similar flexible strip is adhered to or otherwise affixed to the edge of each rake plate 115, although not shown in the figures.

After the cartridge 110 has been mounted to the hopper 106, the shaft 113 is rotated to, in turn, rotate the replenishing member 112. As a result, the flexible strip 116 of the scoop plate 114 scoops up the toner while sliding on the inner periphery of the body 110, thereby replenishing the toner into the hopper 106 via the outlet 117. The strip 116 ensures the replenishment of the toner because of its elasticity and flexibility. The strip 116 should preferably be made of a material capable of remaining elastic and flexible over a long period of time despite its sliding contact with the body 110. The optimal material satisfying these conditions is Mylar (trade name and available from E.I. Du Pont; polyethylene terephthalate).

The conventional cartridge 110, however, has some problems yet to be solved, as discussed earlier. Specifically, the Mylar strip 116 must be adhered to each of the scoop plate 114 and scrape plate 115, resulting in an extra step and extra cost. Moreover, the strip 116 is apt to come off the scoop plate 114 if the adhesion is defective or due to aging. Of course, the strip 116 may be affixed to the scoop plate 114 by crimping, fusing or similar technology, as proposed in the past. However, this also results in an extra step and extra cost and, in addition, causes the strip 116 to come off easily.

Figure 1:
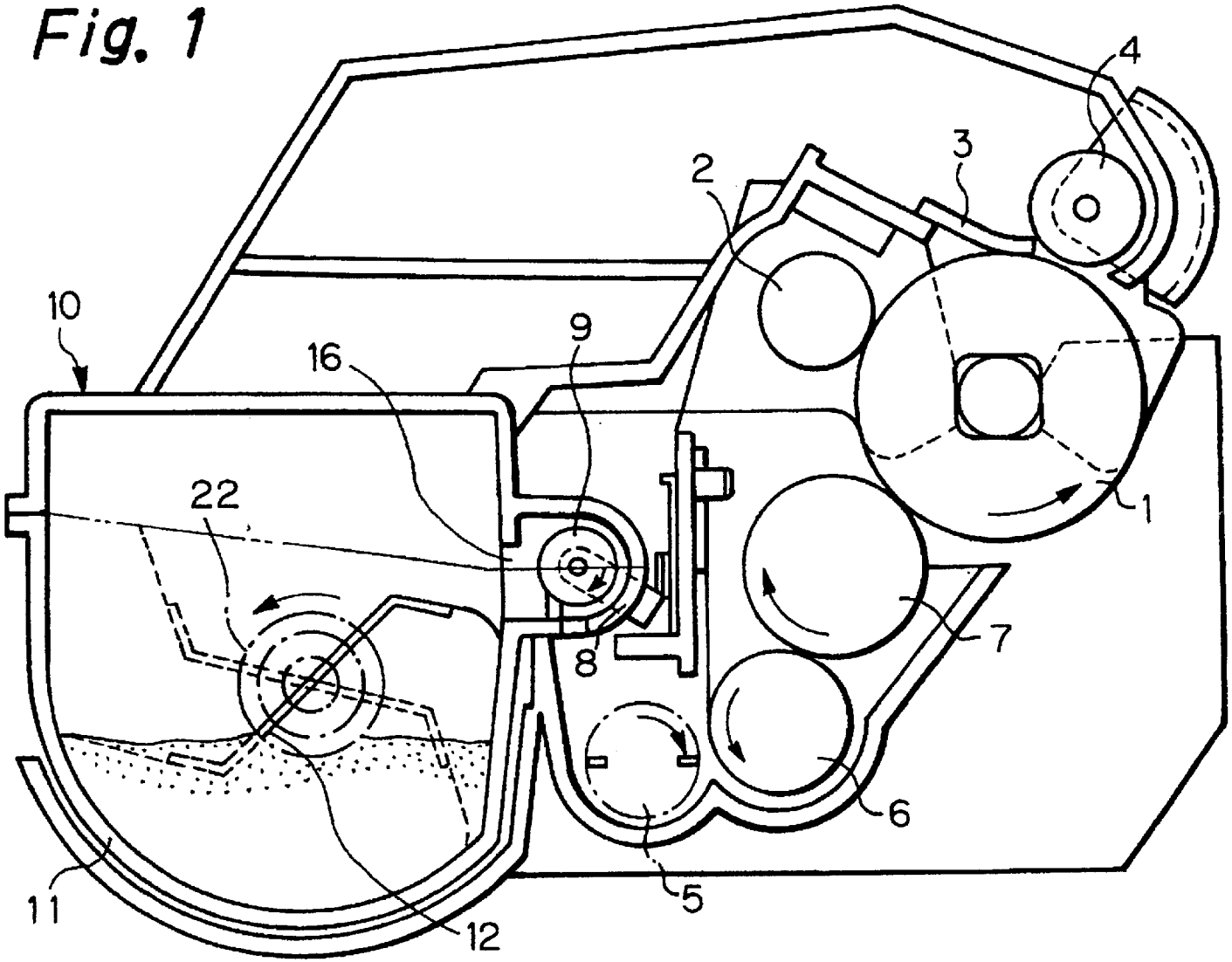
FIG. 1 is a section of a developing unit incorporating a toner cartridge embodying the present invention.

Referring to FIG. 1, a developing unit with a toner cartridge embodying the present invention is shown together with a photoconductive element and some conventional units joining in image formation. An image transfer unit and a fixing unit are not shown in FIG. 1. As shown, a cleaning unit (no numeral) has a blade 3 and a roller 4 and is located above a photoconductive roller or image carrier 1. A charge roller 2 is held in contact with the drum 1 and enclosed by the cleaning unit. The blade 3 scrapes off toner remaining on the drum 1 after image transfer. The roller 4 removes the toner collected by the blade 3. A developing unit (no numeral) has an agitator 5 for agitating toner stored in the unit, a developing roller 6, an intermediate roller 6, and a developing roller 7. The intermediate roller 6 and developing roller 7 supply the toner to the drum 1 while charging it by friction. A toner cartridge 10 is removably mounted to the developing unit and has a hollow body 11. A shutter 8 is mounted on the body 11 and usually closes a toner outlet formed in the body 11. A replenishing roller 9 is also mounted on the body 11, as will be described. As the toner stored in the developing unit decreases, the shutter 8 is opened to replenish fresh toner from the cartridge 10 into the developing unit via the roller 9 and outlet. A replenishing member 12 is disposed in the cartridge 10 and held in slidable contact with the inner periphery of the body 11 at the free edge thereof.

Figure 2:
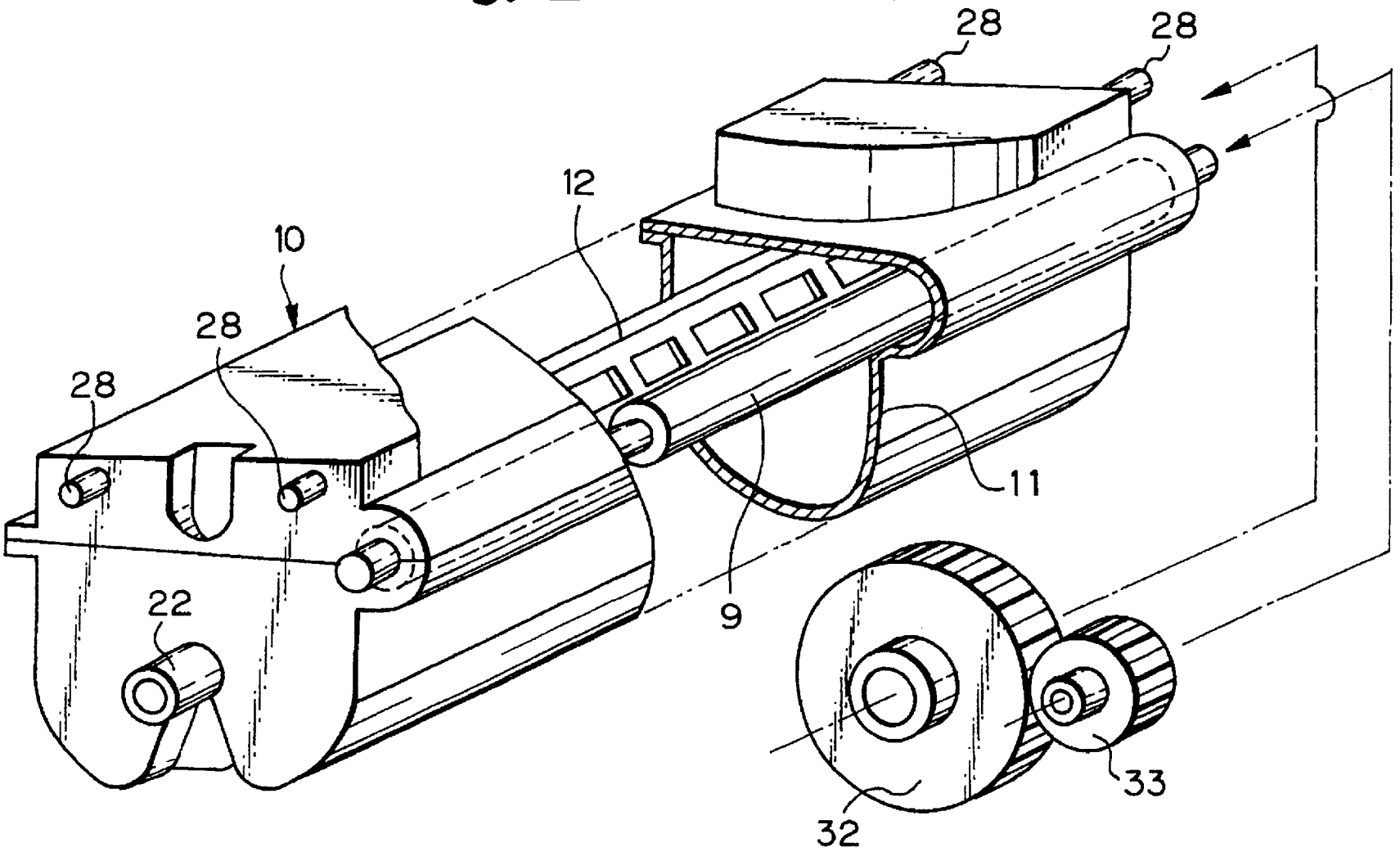
FIG. 2 is a partly taken away perspective view of the embodiment.

As shown in FIG. 2, support pins 28 are studded on the upper portions of opposite ends of the cartridge 10 in order to mount the cartridge 10 surely and stably to the developing unit. The replenishing member 12 is rotatably supported at opposite ends thereof by bearings 22 mounted on the body 11. The member 12 and roller 9 for toner replenishment extend parallel to each other and are operatively connected to each other by intermeshing gears 32 and 33.

Figure 3:
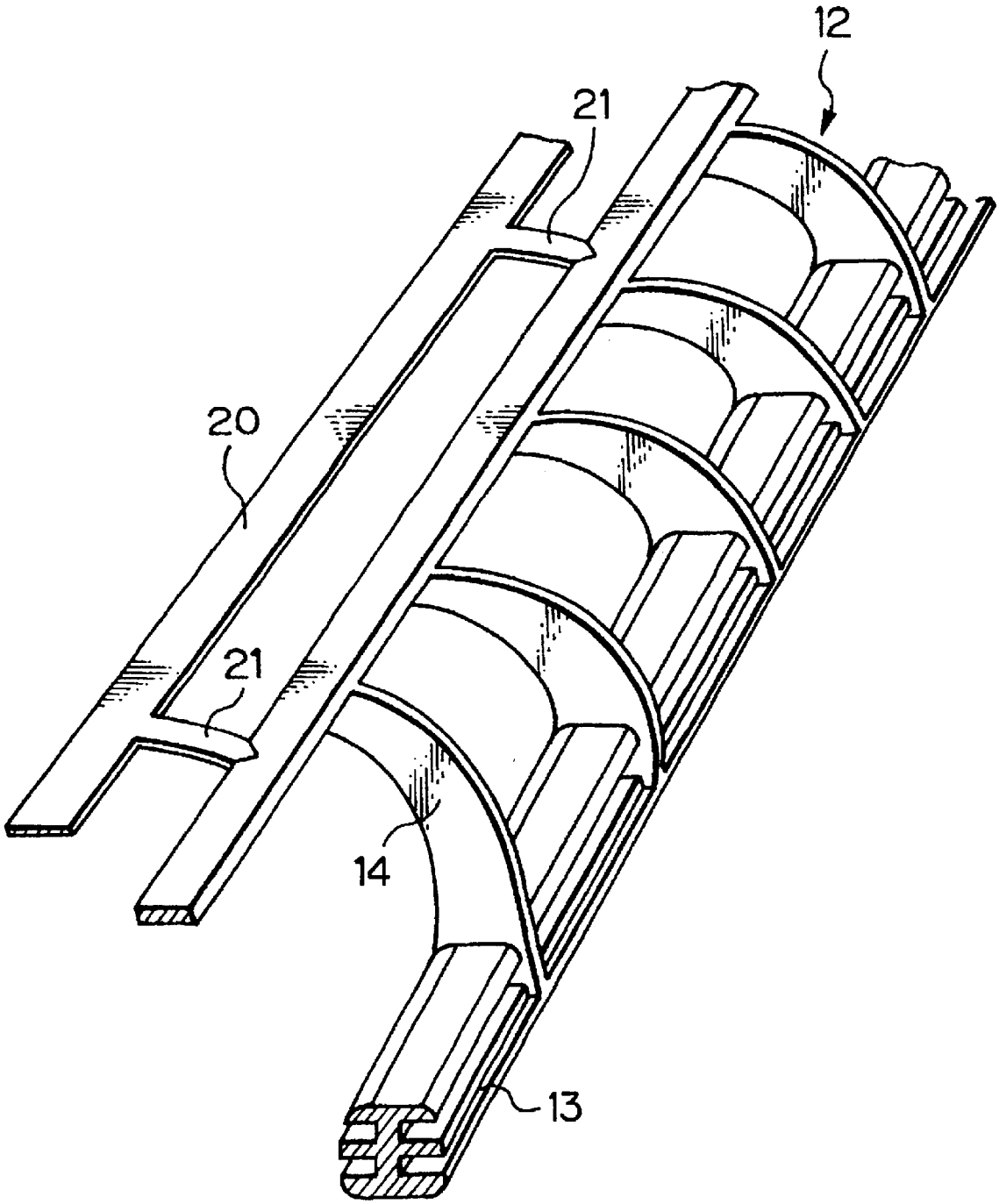
FIG. 3 is a perspective view of a replenishing member included in the embodiment.
Figure 4:
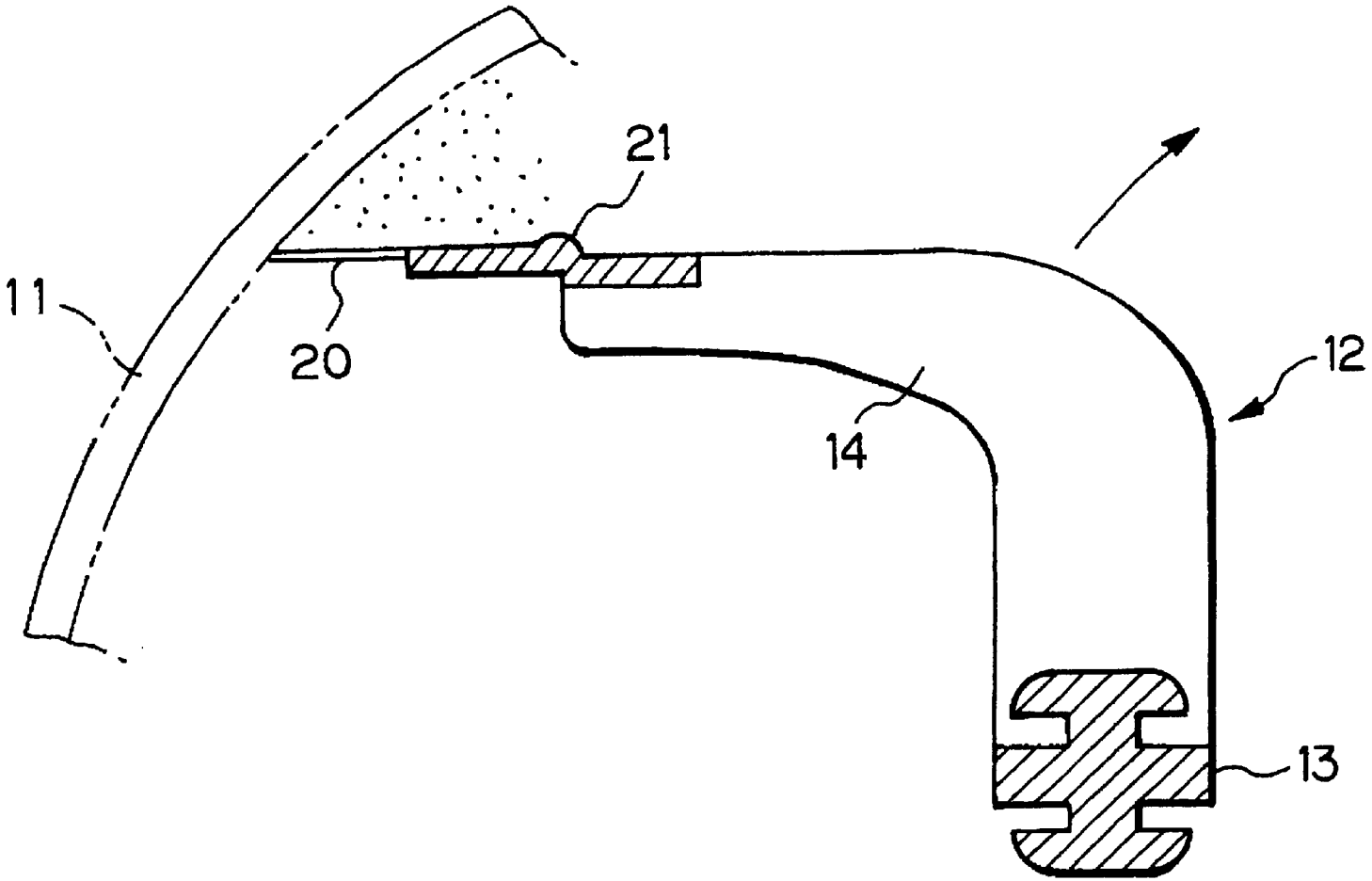
FIG. 4 is a section of the replenishing member.

As shown in FIGS. 3 and 4, the replenishing member 12 has a rotary shaft 13 supported by the above-mentioned bearings 22, and a base or support 14. A thin strip 20 is provided on the free edge of the base 14 that adjoins the inner periphery of the body 11. Specifically, the thin strip 20 is connected to the base 14 by two or more tie pieces 21. The shaft 13, base 14, strip 20 and tie pieces 21 are implemented as a single molding of plastic, e.g., polypropylene (PP). The single molding makes it needless to adhere or otherwise affix a Mylar strip to a base, as in the conventional configuration shown in FIG. 14. This not only reduces the production cost, but also obviates an occurrence that the strip 20 comes off the base 14.

The prerequisite with the strip 20 and tie pieces 21 is that they be as elastic and flexible as the Mylar strip 116 of the conventional cartridge 110. To meet the requirement, the strip 20 is formed as thin as 0.1 mm to 0.3 mm. The tie pieces 21 are also provided with a thickness equal to or about twice the thickness of the strip 20. With such a configuration, the strip 20 and tie pieces 21 achieve a sufficient degree of elasticity. Further, by selecting the width and number of the tie pieces 21 adequately, it is possible to provide the strip 20 with elasticity and flexibility close to these of the Mylar strip 116, FIG. 14. As a result, the strip 20 is held in sliding contact with the inner periphery of the body 11 under a constant pressure.

The distance between the axis of the shaft 13 to the edge of the strip 20 is selected such that the edge of the strip 20 slidingly contacts at least part of the inner periphery of the body 11 surrounding a supply port 16. With this configuration, the strip 20 is capable of scooping up the toner in a desirable manner. While the replenishing member 12, including the strip 20 and tie pieces 21, should preferably be implemented as a molding of polypropylene or similar material, it may be formed of ABS resin, if desired.

Figure 5B:
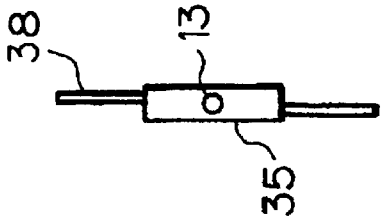
FIG. 5B is an end view of the replenishing member shown in FIG. 5A.
Figure 5A:
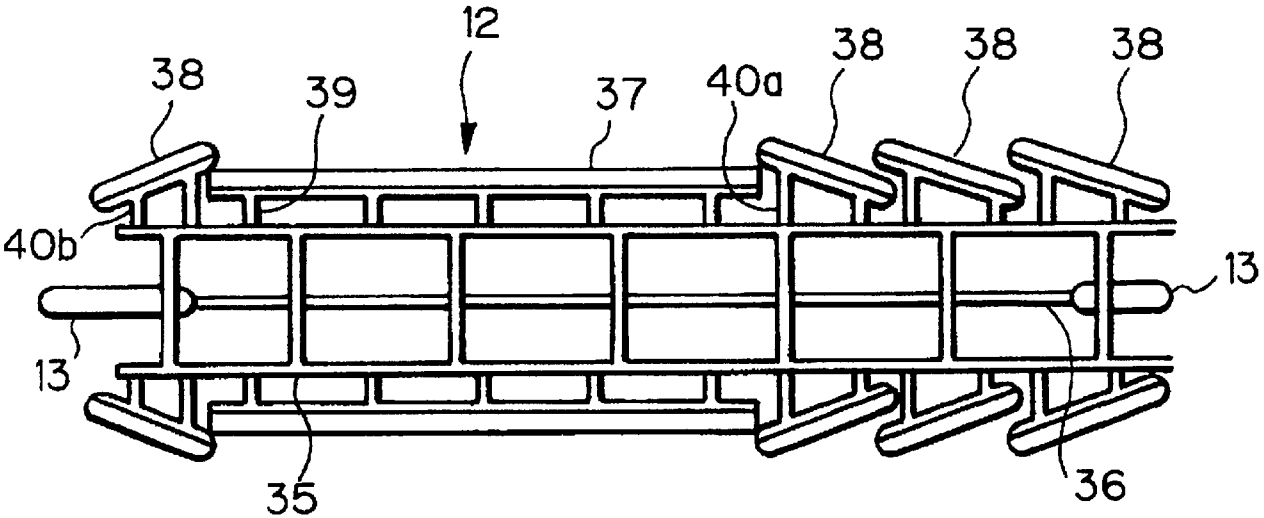
FIG. 5A shows a replenishing member representative of an alternative embodiment of the present invention.

Referring to FIGS. 5A and 5B, an alternative embodiment of the present invention will be described. As shown, the replenishing member 12 has a base or center piece 35 having a flat ladder-like configuration. A shaft 36 extends throughout the center of the base 35 for a reinforcing purpose. The shaft 36 is slightly increased in diameter at axially opposite ends thereof so as to form the shaft portions of the member 12. Thin scoop pieces 37 are connected to opposite side edges of the base 35 by tie pieces 39. Likewise, thin rake pieces 38 are connected to the opposite side edges of the base 35 by tie pieces 40a and 40b.

Nearby tie pieces 40a, supporting one rake piece 38 in cooperation, are different in length from each other such that the rake piece 38 is inclined upward toward the scoop piece 37. In this condition, when the replenishing member 12 is rotated about the shaft portions 13, the rake pieces 38 rake the toner toward the scoop piece 37. The inclination of the rake pieces 38 is, for example, about 15° to about 35° relative to the axis of rotation of the member 12. As also shown in FIG. 5A, the number of scrape pieces 38 is different from one end to the other end of the member 12. In the embodiment, three pieces 38 are provided at the right, and a single piece 38 is provided at the left. The precondition for such a n arrangement is that a drive torque be input to the left shaft portion 13. When a greater number of pieces 38 are located at the side opposite to the torque input side, greater frictional resistance acts between the pieces 38 and the inner periphery of the body 22 at the side opposite to the torque input side. As a result, torsion surely acts on the member 12 about the axis rotation. It should be noted that the number of pieces 38 at either side of the member 12 is open to choice so long as the torsion acts on the member 12.

Both the scoop pieces 37 and the scrape pieces 38 should advantageously be provided on opposite side edges of the ladder-like base 35 and in a 180° symmetrical configuration with respect to the axis of rotation of the member 12, as illustrated. As a result, there can be obviated the irregular distribution of the reaction of the toner and, therefore, the deformation of the shaft 13 during the course of rotation. However, at least one of the scoop pieces 37 and rake pieces 38 may be provided only on side edge of the base 35, if desired.

In the embodiment, the base or center piece 35, reinforcing shaft 36, aligned shaft portions 13, scoop pieces 37, rake pieces 38, and tie pieces 39, 40a and 40b are also implemented as a single molding produced by the injection molding of polypropylene or similar flexible material. The entire replenishing member 12 has a modulus of elasticity of bending ranging from about 42 $kg/mm^2$ to about 454 $kg/mm^2$ and twist easily during rotation due to the particular material. The member 12 achieves additional flexibility because the pieces 37 and 38 are far thinner than the base 35, as shown in FIG. 5B. This, coupled with the fact that the entire member 12 is a skeleton having a bore ratio of, for example, greater than 85%, allows the member 12 to loosen the toner sufficiently. Hence, toner blocking can be obviated even if the packing ratio of the toner in the cartridge 10 is increased.

Figure 6B:
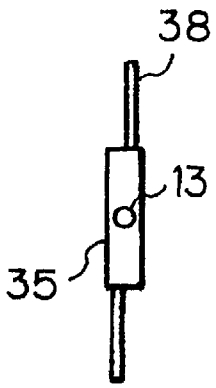
FIG. 6B is an end view of the modified replenishing member.
Figure 6A:
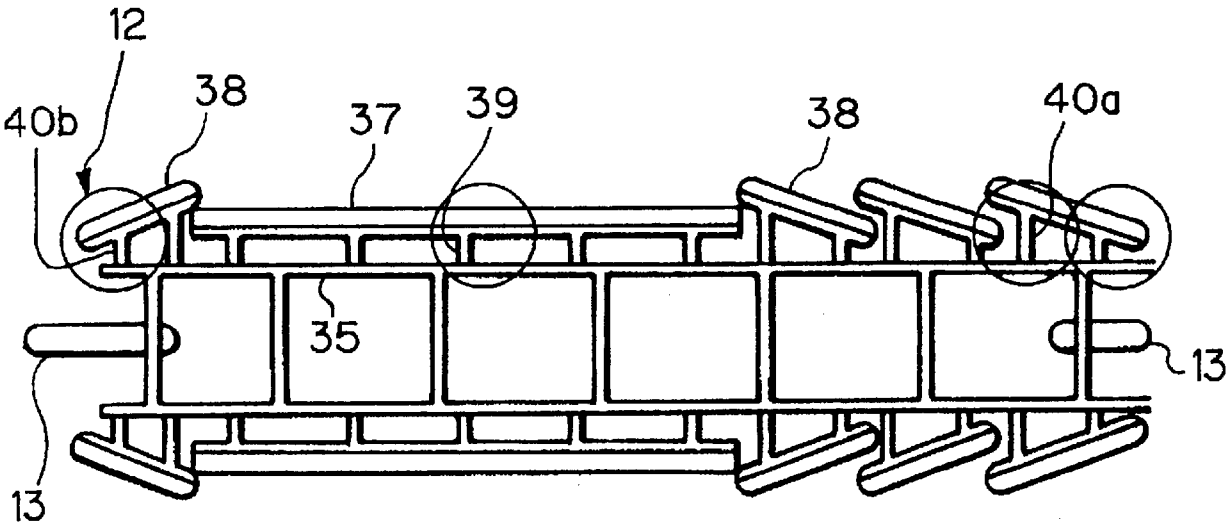
FIG. 6A shows a modified form of the replenishing member shown in FIGS. 5A and 5B.

As shown in FIG. 6A the reinforcing shaft 36 may be omitted except for the opposite shaft portions 13 which are to be supported by the bearings 22. This configuration will further enhance the twist of the replenishing member 12. Although the member 12 of FIG. 6A is identical in cross section as the member 12 of FIG. 5A, as shown in FIG. 6B, the former is capable of twisting more than the latter.

Figure 7C:
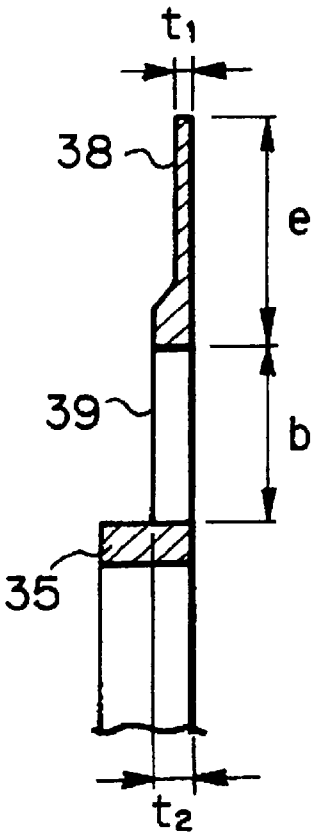
FIGS. 7A–7C are sections each showing the configuration of a particular thin piece included in the replenishing member of FIG. 6A.
Figure 7B:
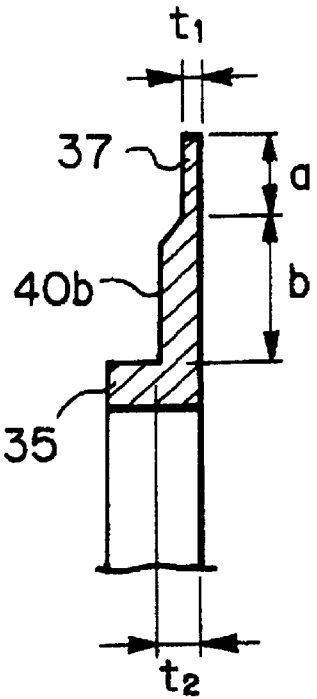
Figure 7A:
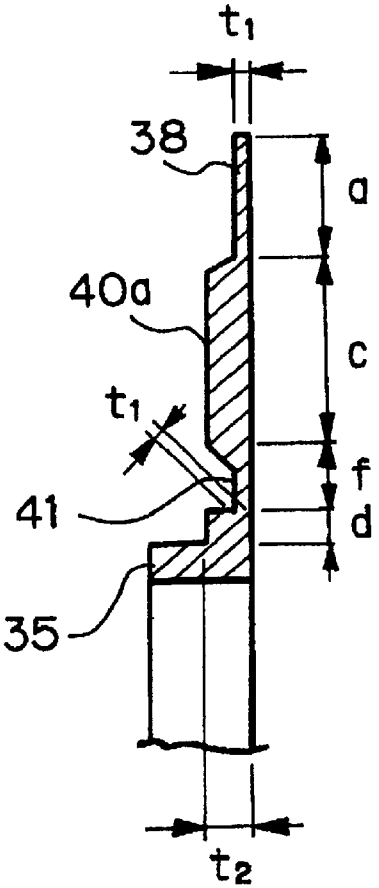
Figure 8:
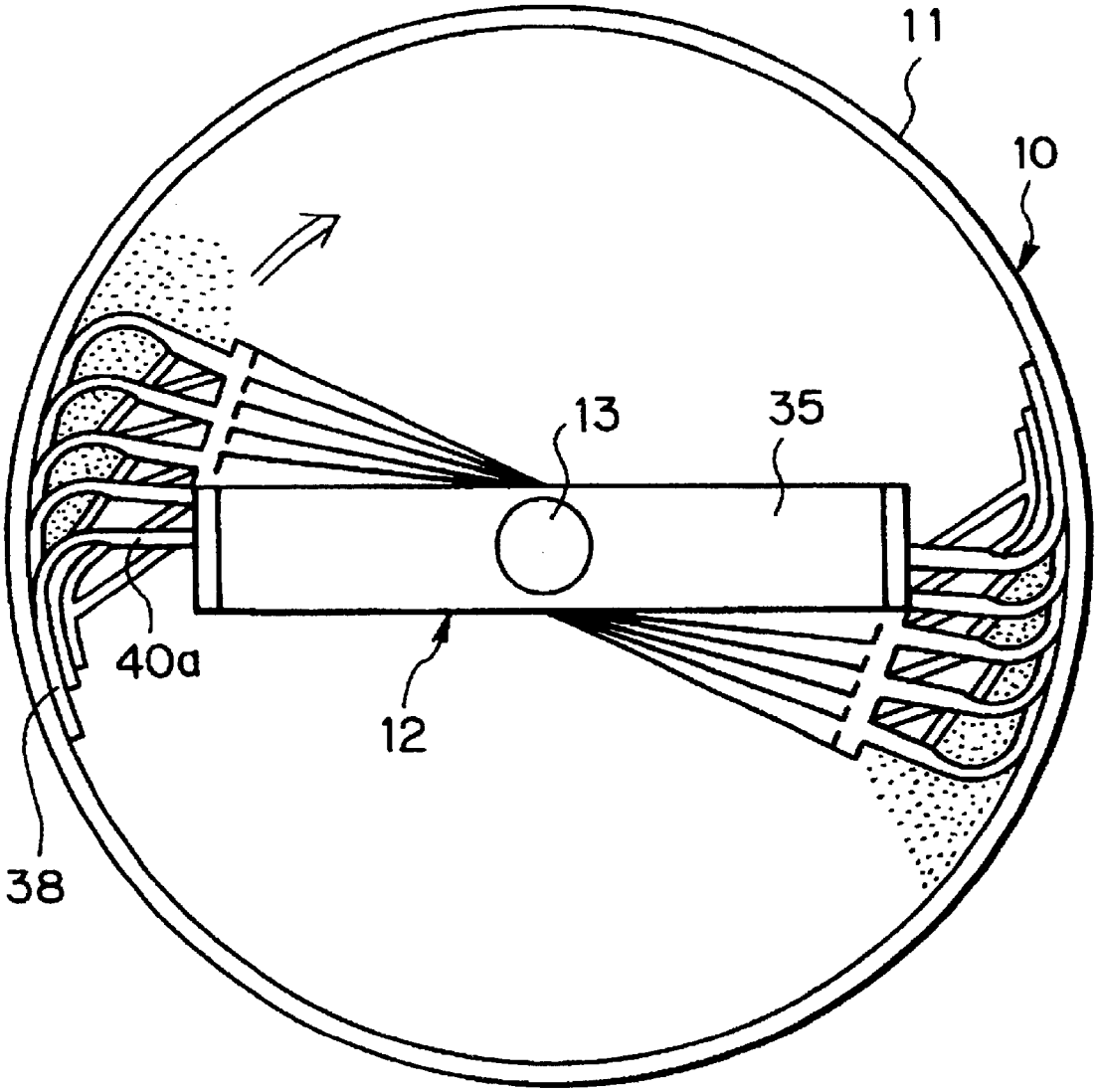
FIG. 8 demonstrates how the replenishing member deforms when rotating in the cartridge

FIGS. 7A, 7B and 7C are enlarged sections respectively showing the portions of the tie pieces 40a, 40b and 39 enclosed by circles in FIG. 6A. As shown, the pieces 40a, 40b and 39 are each thinnest at the tip portion thereof. The thinnest tip has a thickness $t_1$ of, for example, 0.2 mm to 0.3 mm and deforms extremely easily. A thickness $t_2$ is greater than the thickness $t_1$, but it is far smaller than the thickness of the center piece or base 35, as will be seen from FIGS. 5B and 6B. The lengths a and e of the pieces 40a, 40b and 39, the length b of the pieces 39 and 40, and the length (c+f+d) of the piece 40a are determined beforehand in relation to the inside diameter of the cartridge and the dimensions of the base 35. The longer tie piece 40a of the piece 38 has a constricted portion 41 having a length f and a thickness $t_1$. As shown in FIG. 8, when the replenishing member 12 is rotated in the cartridge 10, the tie pieces 40a contiguous with the pieces 38 noticeably bend due to their constricted portions 41. The pieces 38 are, therefore, retarded in the direction of rotation of the member 12 and twisted crosswise. Consequently, because the tie pieces 40a are close to the scoop pieces 37, the pieces 38 are capable of conveying the toner toward the pieces 37. In addition, the base 35 has a substantial degree of flexibility and, therefore, twists itself. Such a twisting motion of the entire member 12 loosens the toner and thereby reduces its bulk density, while protecting the member 12 from breakage.

Figure 9:
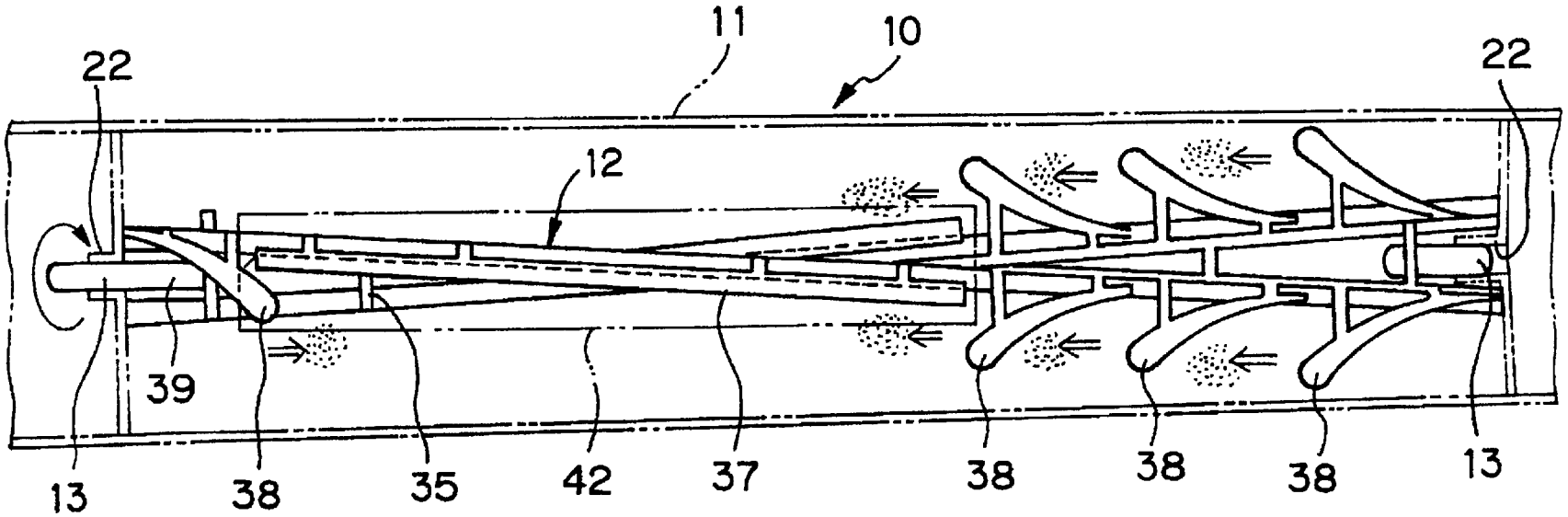
FIG. 9 shows the twist of the replenishing member.

FIG. 9 demonstrates the twist of the replenishing member 12 occurring along the axis of rotation. As shown, a drive torque is input to the left shaft portion 13, as viewed in the figure. When the edges of the thin pieces 37 and 38 slide on the inner periphery of the cartridge body 11, the entire member 12 is caused to twist. At the same time, each piece 38 is retarded more at the portion adjoining the longer tie piece or leg than at the portion adjoining the shorter leg. As a result, the piece 38 causes the toner to move toward the scoop piece 37. The toner loosened by the member 12 is replenished into the developing unit via an outlet formed in the intermediate portion of the cartridge, as represented by the outlet 117 shown in FIG. 12.

Figure 10A:
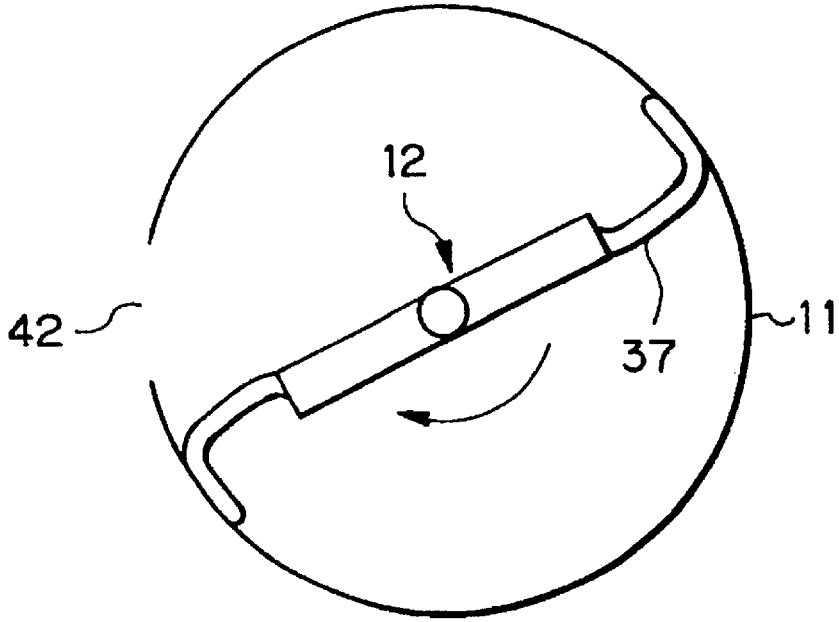
FIG. 10A shows a scrape piece in a condition before springing back to its original position at a supply port formed in the cartridge.
Figure 10B:
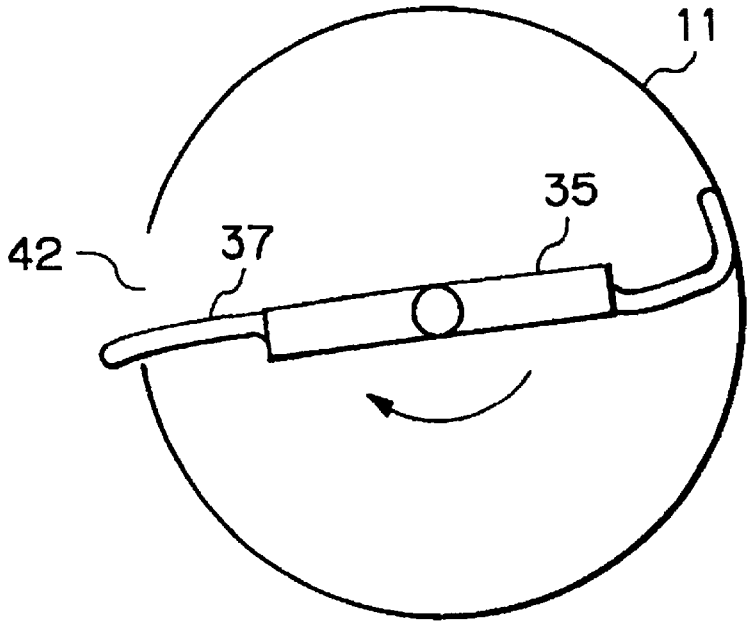
FIG. 10B shows the scrape piece restored to its original position.

Furthermore, as shown in FIG. 10A, each scoop piece 3 7 greatly bends in sliding contact with the inner periphery of the cartridge body 11 during the course of rotation. However, as shown in FIG. 10B, every time the piece 37 reaches a supply port 42 formed in the cartridge body 11, the piece 37 springs back to its original position. This is because the piece 37 has a length smaller than the longitudinal dimension of the supply port 42. The resulting vibration of the piece 37 shakes the toner off the replenishing member 12. In addition, the vibration is imparted to the toner existing in the cartridge body 11 so as to loosen it. This effect derived from the vibration is achievable even if the piece 37 is provided on only one side edge of the base 35.

In summary, it will be seen that the present invention provides a toner cartridge having various unprecedented advantages, as enumerated below.

(1) A replenishing member disposed in a cartridge body is easy to produce and low cost because it does not need any pieces of Mylar or similar material otherwise adhered thereto. Of course, there is obviated an occurrence that such pieces come off the replenishing member.

(2) Despite that the replenishing member is implemented as a single molding, thin pieces can remain in sliding contact with the inner periphery of the cartridge under a constant pressure.

(3) The replenishing member scoops up toner efficiently and can replenish it without wasting it.

(4) The replenishing member elastically deforms and loosens the toner despite its simple configuration. Hence, the member can be rotated by a minimum of torque.

(5) The replenishing member deforms to an adequate degree due to the difference in friction between the thin pieces of the inner periphery of the cartridge.

(6) The toner loosened by, among the thin pieces, rake pieces is conveyed toward scoop pieces.

(7) When the thin pieces contact the inner wall of the cartridge, the rake pieces noticeably tilt relative to the axis of the cartridge and thereby further ensure the conveyance of the toner.

(8) Symmetrical forces act on the rotary shaft of the replenishing member, so that the shaft is free from deformation.

(9) Every time each scoop piece reaches a supply port formed in the cartridge, it springs back to its original position. The resulting vibration shakes the toner off the thin pieces and other various portions of the replenishing member. In addition, the vibration is imparted to the toner in the cartridge, thereby loosening the toner.

Various modifications will become possible for those skilled in the art after receiving the teachings of the present disclosure with departing from the scope thereof.

What is claimed is:

1. A toner cartridge for replenishing toner into a developing device, comprising:

a cartridge body having an inner surface and formed with a toner supply port; and a replenishing member rotatably disposed in said cartridge body, and for replenishing the toner from said cartridge body into the developing device via said toner supply port when rotated;

said replenishing member comprising:

a base having a rotary shaft; and a thin piece provided at a free edge of said base to constantly contact the inner surface of the cartridge body during rotation;

said base and said thin piece comprising a single molding.

2. A toner cartridge as claimed in claim 1, wherein said replenishing member further comprises at least two tie pieces connecting said thin piece and said base.

3. A toner cartridge as claimed in claim 2, wherein a thickness and a width of said at least two tie pieces are so selected as to provide said thin pieces, including said at least two tie pieces, with elasticity.

4. A toner cartridge as claimed in claim 1, wherein a distance between a center of rotation of said replenishing member and an outermost edge of said thin piece is at least great enough for said outermost edge to slidingly contact part of an inner periphery of Said cartridge body surrounding toner supply port.

5. A toner cartridge for replenishing toner into a developing device, comprising:

a cartridge body formed with a toner supply port; and a replenishing member rotatably disposed in said cartridge body, and for replenishing the toner from said cartridge body into the developing device via said toner supply port when rotated;

said replenishing member comprising:

a base having a rotary shaft; and a thin piece provided at a free edge of said base;

said base and said thin piece comprising a single molding, wherein said base comprises a flat ladder-like center piece and said thin piece comprises rake pieces and a scoop piece slidably contacting an inner periphery of said cartridge body, and wherein said rake pieces adjoin longitudinally opposite ends of said center piece while said scoop piece intervenes between said rake pieces.

6. A toner cartridge as claimed in claim 5, wherein said rake pieces slidably contact the inner periphery of said cartridge body, wherein said center piece is driven to rotate at one of the longitudinally opposite ends thereof, and wherein said rake pieces are arranged in a smaller number at the one end of said center piece than at the other end.

7. A toner cartridge as claimed in claim 5, wherein said rake pieces each has an outermost edge inclined relative to a center of rotation of said center piece such that one side of said rake piece closer to said scoop piece is higher in level than the other side.

8. A toner cartridge as claimed in claim 7, wherein said rake pieces are each connected to said center piece by a comparatively long tie piece and a comparatively short tie piece, and wherein said comparatively long tie piece is reduced in thickness at a portion thereof adjoining said center piece.

9. A toner cartridge as claimed in claim 5, wherein said replenishing member comprising said center piece, said rake pieces and said scoop piece is provided with a 180° symmetrical configuration with respect to a center of rotation.

10. A toner cartridge as claimed in claim 5, wherein said scoop piece has a length smaller than a width of said toner supply port, as measured in a longitudinal direction of said cartridge body.

11. The toner cartridge according to claim 5, wherein the thin piece contacts an inner surface of the cartridge body.

*12. A toner cartridge for replenishing toner into a developing device, comprising:*

*a cartridge body having an inner surface and formed with a toner supply port; and*

*a movable member disposed in said cartridge body, and for replenishing the toner from said cartridge body into the developing device via said toner supply port when moved;*

*said movable member comprising:*

*a movable base; and*

*a piece provided at said base to constantly contact the inner surface of the cartridge body during movement, wherein a width of said piece is less than a dimension of an opening of said supply port, and wherein said piece vibrates at said toner supply port.*

*13. A toner cartridge as claimed in claim 12, wherein said replenishing member further comprises at least two pieces connecting said thin piece and said base.*

*14. A toner cartridge as claimed in claim 13, wherein a thickness and a width of said at least two pieces are so selected as to provide said thin piece, including said at least two tie pieces, with elasticity.*

*15. A toner cartridge as claimed in claim 12, wherein a distance between a center of rotation of said replenishing member and an outermost edge of said thin piece is at least great enough for said outermost edge to slidingly contact part of an inner periphery of said cartridge body surrounding said toner supply port.*

*16. A toner cartridge for replenishing toner into a developing device, comprising:*

*a cartridge body having an inner surface and formed with a toner supply port; and*

*a movable member disposed in said cartridge body, and for replenishing the toner from said cartridge body into the developing device via said toner supply port when moved;*

*said movable member comprising:*

*a movable base; and*

*a rake piece provided at said base to constantly contact the inner surface of the cartridge body during movement;*

*said base and said rake piece comprising a single molding, and wherein said rake piece vibrates at said toner supply port.*

*17. A toner cartridge as claimed in claim 16, wherein said rake piece slidably contacts the inner surface of said cartridge body.*

*18. A toner cartridge as claimed in claim 16, wherein said rake piece has an outermost edge inclined relative to a center of rotation such that one side of said rake piece is higher in level than the other side.*

*19. A developing device including a toner cartridge for replenishing toner into a developing device, said toner cartridge comprising:*

*a cartridge body having an inner surface and formed with a toner supply port; and*

*a movable member disposed in said cartridge body, and for replenishing the toner from said cartridge body into the developing device via said toner supply port when moved;*

*said movable member comprising:*

*a movable base; and*

*a piece provided at said base to constantly contact the inner surface of the cartridge body during movement, wherein a width of said piece is less than a dimension of an opening of said supply port, and wherein said piece vibrates at said toner supply port.*

*20. A developing device as claimed in claim 19, wherein said thin piece vibrates at said supply port.*

*21. A developing device as claimed in claim 19, wherein said replenishing member further comprises at least two tie pieces connecting said thin piece and said base.*

*22. A developing device as claimed in claim 21, wherein a thickness and a width of said at least two tie pieces are so selected as to provide said thin piece, including said at least two tie pieces, with elasticity.*

*23. A developing device as claimed in claim 19, wherein a distance between a center of rotation of said replenishing member and an outermost edge of said thin piece is at least*

*great enough for said outermost edge to slidingly contact part of an inner periphery of said cartridge body surrounding said toner supply port.*

*24. A developing device including a toner cartridge for replenishing toner into a developing device, said toner cartridge comprising:*

*a cartridge body having an inner surface and formed with a toner supply port; and*

*a movable member disposed in said cartridge body, and for replenishing the toner from said cartridge body into the developing device via said toner supply port when moved;*

*said movable member comprising:*

*a movable base; and*

*a rake piece provided at said base to constantly contact the inner surface of the cartridge body during movement;*

*said base and said rake piece comprising a single molding, and wherein said rake piece vibrates at said toner supply port.*

*25. A developing device as claimed in claim 24, wherein said rake piece slidably contacts the inner surface of said cartridge body.*

*26. A developing device as claimed in claim 24, wherein said rake piece has an outermost edge inclined relative to a center of rotation such that one side of said rake piece is higher in level than the other side.*

*27. An image forming apparatus comprising:*

*a developing device configured to develop a toner image;*

*a toner cartridge for replenishing toner into a developing device, the toner cartridge comprising:*

*a cartridge body having an inner surface and formed with a toner supply port; and*

*a movable member disposed in said cartridge body, and for replenishing the toner from said cartridge body into the developing device via said toner supply port when moved;*

*said movable member comprising:*

*a base having a rotary shaft; and*

*a piece provided at said base to constantly contact the inner surface of the cartridge body during movement, wherein a width of said piece is less than a dimension of an opening of said supply port, and wherein said piece vibrates at said toner supply port.*

*28. An image forming apparatus as claimed in claim 27, wherein said thin piece vibrates at said supply port.*

*29. An image forming apparatus as claimed in claim 27, wherein said replenishing member further comprises at least two tie pieces connecting said thin piece and said base.*

*30. An image forming apparatus as claimed in claim 29, wherein a thickness and a width of said at least two tie pieces are so selected as to provide said thin piece, including said at least two tie pieces, with elasticity.*

*31. An image forming apparatus as claimed in claim 27, wherein a distance between a center of rotation of said replenishing member and an outermost edge of said thin piece is at least great enough for said outermost edge to slidingly contact part of an inner periphery of said cartridge body surrounding said toner supply port.*

*32. An image forming apparatus comprising:*

*a developing device configured to develop a toner image;*

*a toner cartridge for replenishing toner into a developing device, said toner cartridge comprising:*

*a cartridge body having an inner surface and formed with a toner supply port; and*

*a movable member rotatably disposed in said cartridge body, and for replenishing the toner from said cartridge body into the developing device via said toner supply port when moved;*

*said movable member comprising:*

*a movable base; and*

*a rake piece provided at said base to constantly contact the inner surface of the cartridge body during movement;*

*said base and said rake piece comprising a single molding, and wherein said rake piece vibrates at said toner supply port.*

*33. An image forming apparatus as claimed in claim 32, wherein said rake piece slidably contacts the inner surface of said cartridge body.*

*34. An image forming apparatus as claimed in claim 32, wherein said rake piece has an outermost edge inclined relative to a center of rotation such that one side of said rake piece is higher in level than the other side.*

* * * * *

UNITED STATES PATENT AND TRADEMARK OFFICE

CERTIFICATE OF CORRECTION

PATENT NO. : RE 37,542 E
DATED : February 5, 2002
INVENTOR(S) : Ichikawa et al.

It is certified that error appears in the above-identified patent and that said Letters Patent is hereby corrected as shown below:

Title page,
Item [30], the Foreign Application Priority information should read:

-- [30] Foreign Application Priority Data
Jul. 15, 1994 (JP) ..... 6-163774
Sep. 16, 1994 (JP) ..... 6-221610
Dec. 14, 1994 (JP) ..... 6-310773
May 23, 1995 (JP) .....7-123498 --

Signed and Sealed this

Eighteenth Day of June, 2002

*Attest:*

*Attesting Officer*

JAMES E. ROGAN
*Director of the United States Patent and Trademark Office*